United States Patent
Manasse

(10) Patent No.: US 10,019,383 B2
(45) Date of Patent: Jul. 10, 2018

(54) ROTATABLE-KEY ENCRYPTED VOLUMES IN A MULTI-TIER DISK PARTITION SYSTEM

(71) Applicant: salesforce.com, inc., San Francisco, CA (US)

(72) Inventor: Mark Manasse, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 80 days.

(21) Appl. No.: 15/365,658

(22) Filed: Nov. 30, 2016

(65) Prior Publication Data

US 2018/0150412 A1 May 31, 2018

(51) Int. Cl.
*G06F 3/06* (2006.01)
*G06F 21/62* (2013.01)
*G06F 12/14* (2006.01)
*G06F 21/45* (2013.01)
*G06Q 50/18* (2012.01)

(52) U.S. Cl.
CPC .......... *G06F 12/1408* (2013.01); *G06F 3/065* (2013.01); *G06F 3/067* (2013.01); *G06F 3/0619* (2013.01); *G06F 3/0643* (2013.01); *G06F 3/0665* (2013.01); *G06F 3/0689* (2013.01); *G06F 21/45* (2013.01); *G06F 21/62* (2013.01); *G06Q 50/184* (2013.01)

(58) Field of Classification Search
CPC ...... G06F 21/45; G06F 3/0619; G06F 3/0665; G06F 3/0689; G06F 3/067; G06F 3/065; G06F 21/62; G06F 3/0643; G06Q 50/184
See application file for complete search history.

(56) References Cited

U.S. PATENT DOCUMENTS

| | | | | |
|---|---|---|---|---|
| 5,408,644 | A * | 4/1995 | Schneider | G06F 12/0804 711/E12.019 |
| 9,104,339 | B1 * | 8/2015 | Kalekar | G06F 3/061 |
| 9,432,298 | B1 * | 8/2016 | Smith | H04L 49/9057 |
| 2006/0133389 | A1 * | 6/2006 | Wybenga | H04L 41/0896 370/401 |
| 2006/0224825 | A1 * | 10/2006 | Mogi | G06F 11/3433 711/113 |
| 2017/0285978 | A1 * | 10/2017 | Manasse | G06F 3/0619 |
| 2017/0286297 | A1 * | 10/2017 | Voigt | G06F 12/0828 |

* cited by examiner

*Primary Examiner* — Mohammad A Siddiqi
(74) *Attorney, Agent, or Firm* — Holland & Hart LLP

(57) ABSTRACT

Disclosed technology includes access to rotatable-key-encrypted content in a multi-tier disk partition system, with a first-tier-track, and initializing a second-tier-track accessible using the same block designator. A stack of bit vectors, stored in SSD memory, represents tier-tracks and a bit flag indicates whether a respective tier-track holds currently-active data or another bit vector needs to be consulted for access to a predecessor of the tier-track. Copying forward of data from the first-tier-track to the second-tier-track, as-scheduled or in response to an authorized write access to the second-tier-track includes, prior to completion, responding to an access request by providing data from the second-tier-track that has been copied forward and following mappings associated with the flag sets to provide data from the first-tier-track. First-tier-tracks are encrypted using a first encryption key; and a second encryption key is applied to encrypt data in the second-tier-tracks during the copying forward and write access.

25 Claims, 7 Drawing Sheets

ROTATABLE-KEY ENCRYPTED VOLUMES IN A MULTI-TIER DISK PARTITION SYSTEM

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

As businesses build larger data repositories for big data analytics, protection of data at rest is becoming a key concern among security administrators. Compliance and regulation requirements are designed to protect consumer information, personal data and customer information from unauthorized sources. As more customers store personally identifiable information (PII), sensitive, confidential or proprietary data, enterprises must ensure the privacy and confidentiality of that data—to meet both external and internal data compliance policies.

The problem of protecting data that leaves the premise and traverses the cloud is a challenge that takes precedence for today's connected businesses. Some analysts are estimating that by 2017 two-thirds of all workloads will be processed in the cloud and 1.4 zettabytes (1.4 times ten to the twenty-first power) of data will be flowing over global networks meaning that the majority of data will be in motion and remain in motion as it traverses the cloud. The concept of data at rest is undergoing redefinition—data at rest is moving into the cloud at least partly due to hosted big data analytics platforms, cloud based Hadoop file systems and cloud-based backup and disaster recovery systems.

Every industry has its own unique compliance and governance requirements. Customers need an extra level of control to meet internal or regulatory compliance requirements. IT departments and developers need to be able to build and maintain a layer of trust, transparency, compliance, and governance into business-critical apps.

Encryption makes it possible for users to encrypt their most sensitive data and files across their apps, while retaining important app functionality like search, workflow, and validation rules. Cloud-based applications need to support users to encrypt data and files, while retaining full control over the management of the encryption keys.

Existing encryption tools and services can be mapped onto virtual drives that can provide flexibility, and efficient, transportable, and deployable-in-the-public-cloud forms of partition encryption. In the aftermath of using such an encryption service, the question arises of how to handle client-driven or service-driven encryption key rotation; that is, a change to the encryption key used to protect a tenant, typically driven by the tenant after the departure of an employee with knowledge of the key, or due to regulatory, security policy, or more nefarious choices by the client. In some use cases, tenants are offered the option of configuring their system to rotate encryption keys daily, as desired. Note that the keys used to encrypt a drive are likely to be a mixture of client and service-supplied keys to help ensure adequate entropy, typically by running a combination of these keys through a deterministic one-way hash function.

For encryption key rotation, a system must maintain a list of keys to be used for decrypting and encrypting tenant data, and the system must be able to apply these keys as the software needs to read the corresponding data. Additionally, to migrate from an old encryption key to a new encryption key, existing data must be read and re-encrypted, a process which can take hours. To avoid service outages for customers who choose to rotate keys, an enterprise needs to, at times, be willing to apply old encryption keys as well as new encryption keys to data that needs to flow into their applications, at least to perform on-the-fly re-encryption.

The requirements described above for encryption key rotation complicate the view of an application: if the appropriate key cannot be used at the operating system layer to force decryption on reads and encryption on writes, the application will need greater insight into the appropriate encryption keys and the segments of the underlying disk partition to which they apply.

Existing solutions for encryption key rotation limit the amount of data per tenant to be small enough to re-encrypt at the moment of key rotation (using enough parallelism to make this fast), or take the tenant out of service (at least for writes) for the duration of re-encryption, or specially code the encryption keys into a known-and-implemented-by-the-application encryption tool.

SUMMARY

The disclosed technology for implementing access to content in a multi-tier disk partition system makes it feasible to sidestep three issues: a limit that ensures a small-enough quantity of data, per tenant, to be able to re-encrypt at the moment of key rotation; taking the tenant out of service for the duration of re-encryption; and specially coding the encryption keys into an encryption tool known by the application.

To provide the appearance of no encryption to the application layer, in the non-rotating encryption key use case, the disclosed technology would use a platform-independent disk encryption on-disk format to facilitate compatibility and interoperability among different applications, and to assure password management implemented in a secure and documented manner. This approach enables the presentation of tracks which are, when disk-resident, encrypted, but which are fully decrypted as they are moved into primary memory. In one implementation, the open source Linux tool LUKS is capable of creating encrypted raw volumes.

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

The disclosed technology includes a method of access to content in a multi-tier disk partition system that includes using a disk partition system that has a first-tier-track in persistent memory (magnetic, solid-state, phase-change, or any other technology capable of persistent storage), and the disk partition system running on a hardware processor. The disk partition system initializes a second-tier-track in the persistent memory, wherein the second-tier-track supports file blocks residing on the second-tier-track that are accessible using a same block designator as the disk blocks residing on the first-tier-track. The second-tier-track is in a disk partition that has a stack of bit vectors for respective tiers of tracks, including a first-tier bit vector and a second-tier bit vector. A second-tier-track bit flag in the second-tier bit vector indicates whether a respective second-tier-track is current and holds currently active data or whether another bit vector in the stack of bit vectors needs to be consulted for access to a predecessor of the respective second-tier-track. The method includes copying-forward data from the first-tier-track to the second-tier-track, at an earlier of an as-scheduled or in response to an authorized read or write access to the second-tier-track; and during and prior to completion of the copying forward, the disk partition system responding to an access request for data residing in the second-tier-track by providing data available from the second-tier-track that has been copied forward and by following mappings associated with the predecessor of the second-tier-track to access data in the first-tier-track to provide data from the first-tier-track.

Also disclosed, the method includes the disk partition system initializing a third-tier-track, wherein blocks in the third-tier-track are accessible using a same block designator as respective file blocks residing on the second-tier-track, and the third-tier-track has a third-tier bit vector that indicates whether a respective third-tier-track is current and holds currently active data or whether another bit vector in the stack of bit vectors needs to be consulted for access to a predecessor of the respective third-tier-track. The method also includes copying forward data from the second-tier-track, at an earlier of as-scheduled or responsive to an authorized write access to the third-tier-track; and during and prior to completion of the copying forward, the disk partition system responding to an access request for data residing in the third-tier-track by providing data available from the third-tier-track that has been copied forward and by following mappings associated with the predecessor of the third-tier-track to access data in the second-tier-track to provide data from the second-tier-track.

The disclosed technology includes the first-tier-track encrypted using a first encryption key, and applying a second encryption key to encrypt data in the second-tier-track during the copying forward and write access; and writing data to the second-tier-track using the second encryption key, as an update to data provided from the first-tier-track, during the copying forward from the first-tier-track to the second-tier-track. The method also includes applying a third encryption key to encrypt data in a third-tier-track during the copy forward and write process. The method further includes responding to the access request—providing data from a combination of the second-tier-track and first-tier-track during the copying forward from the first-tier-track to the second-tier-track.

The disclosed technology improves key rotation at the disk partition system layer, allowing client application software to remain blissfully ignorant of the keys involved, other than increasing the operating system involvement at tenant login time to supply the necessary suite of keys to open all of the tenant tracks with matching keys, and to construct the disk partition system needed.

Other aspects and advantages of the technology disclosed can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

DETAILED DESCRIPTION

Introduction

Figure 1:
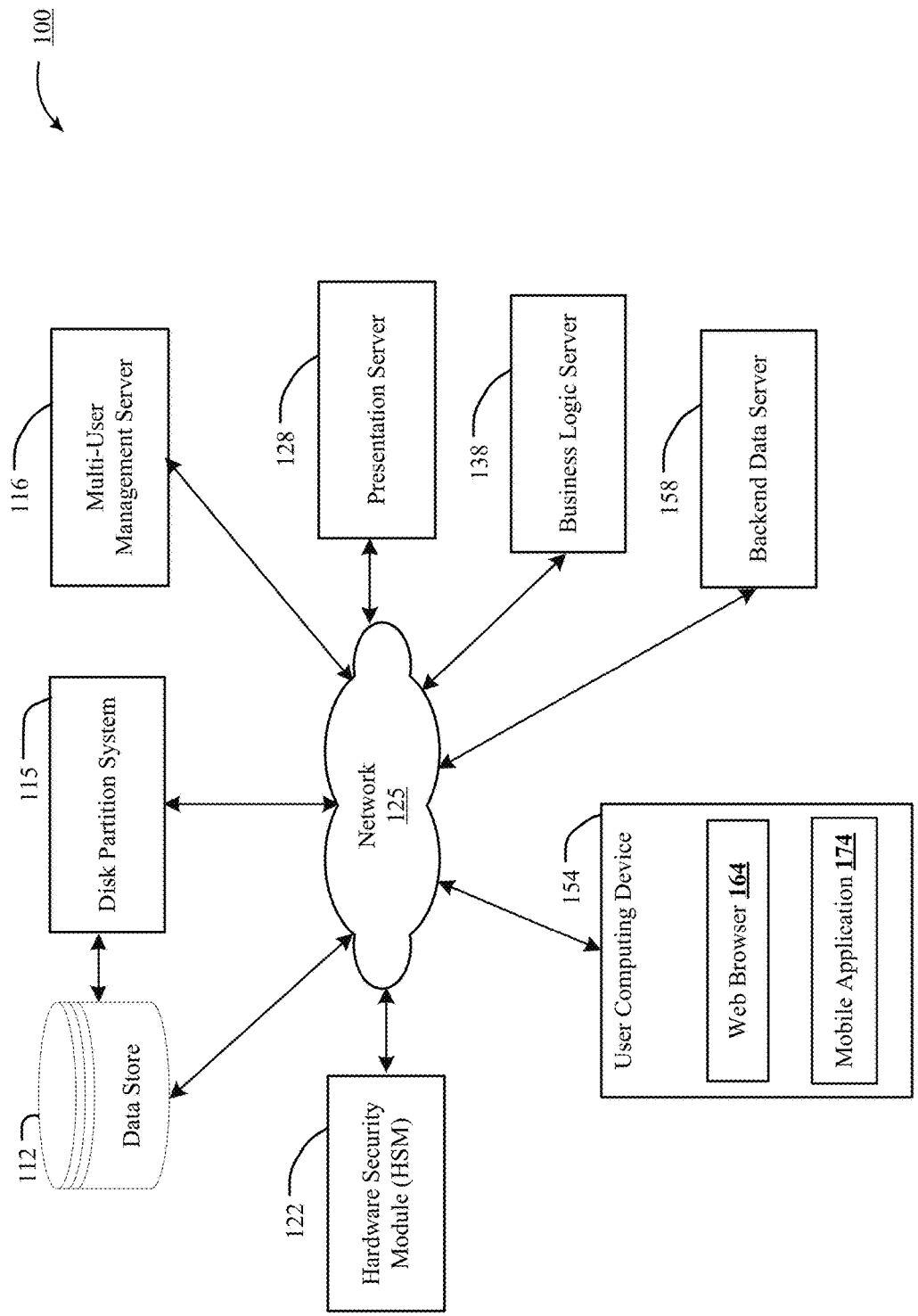
FIG. 1 illustrates one implementation of an environment for access to content in rotatable-key encrypted volumes in a multi-tier disk partition system.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Current-day disk drives are uncomfortably large, while retaining many of the performance characteristics of yesteryear. Although platters have continued to shrink in diameter, desktop drives remain at 3.5 inches, while laptop drives now have diameters of only 2.5 inches. Nonetheless, these sizes place rotational speed limitations on drives so that points on the outer edge of a disk platter stay at subsonic speeds. The outer edge of a platter has circumference defined as pi times the diameter in inches. For a 3.5 inch diameter disk platter, the circumference is approximately eleven inches and for a 2.5 inch diameter disk platter, the circumference is approximately eight inches. The speed of sound, referred to as Mach one, is 768 miles per hour, or 1,126 feet per second. For a desktop drive with a circumference slightly under a foot, and with disk rotational speeds reported in rotations per minute, it is important to stay below 60,000 revolutions per minute (rpm) to stay below the sound barrier. Fortunately, most conventional disks rotate considerably slower than this, at speeds closer to 10,000 rpm, with the fastest drives spinning about twice this fast.

Consequently, the rotational latency of a typical disk is approximately five milliseconds, with seek times to position the head that are similar—to preserve the aerodynamics of the read/write head. After locating a track, it makes sense to read or write the entire track ignoring whether the data we want is positioned at the read head, allowing reads and writes to be performed opportunistically and out-of-order to obviate the rotational latency. That is, by storing a complete track in primary memory upon a read or write, future reads can access the data in low-latency memory and avoid the rotational latency of five to ten milliseconds.

A per-tenant encrypted disk partition system, implemented to prevent inadvertent transmission of customer data to other tenants or to third parties, would include creating an encrypted virtual drive large enough to hold the data owned by a tenant—and likely would include over-allocation, to avoid under-allocating resources as tenants grow.

Given the physical constraints of disk storage, when virtualizing a disk drive into many small drives, it makes sense to set a lower bound of roughly one track, which stores approximately one gigabyte on current drives, as the unit of virtualization. Larger enterprise orgs will need larger partitions to fully encrypt all of their content, while small business orgs that are less likely to pay for individual encryption of their data separately from other business orgs, can be stored with other tenants on virtual drives encrypted using a shared per-release service key. An organization that wants to avoid commingling their data with other business tenants can choose to pay to have sole use of one or more volumes of disk space.

Logical volume management (LVM) is usable to create and manage raw virtual drives, and unified-key-setup disk encryption sets a first encryption key. An added bit vector stack, stored in SSD memory, stores the status of occupancy of encrypted tracks—storing the block designator range and a bit flag that indicates whether a track is current and holds currently active data—for each track in the partition. SSD memory offers reduced latency for logging writes and recoding acknowledgements from the disk drives of pending updates during a copy-forward. The block designator utilizes a logical block addressing scheme for specifying the location of blocks of data, with linear addressing with blocks located by an integer index. Most current day hard disk drives implement logical block addressing. A different block designator scheme for accessing blocks of data on a track on a disk partition can also be implemented for the disclosed technology.

When first created and initialized to encrypted zeroes, the tracks are not yet up-to-date, unless the initialized partition has not yet had a key rotation. When data gets written to a first-tier-track, the data is read-only, the bit vector for the track gets updated, and the data is accompanied by a first encryption key.

When new data gets written to the first-tier-track, the corresponding encryption key gets created for a second-tier-track and a background operating system (OS) process begins reading a track-sized amount of data from a first-tier track on a partition, using the previous encryption key. The process re-encrypts the data with the new encryption key, and copies the re-encrypted data forward to a second-tier-track of the writable partition. After this re-encrypted data is committed to disk, the process writes the bit vector for the new track on the partition to indicate that the first-tier-track has been migrated. The process will update the bit vector to accurately handle reads of recently-written data. The bit vector gets updated first in SSD memory, as data gets read and re-encrypted. After the bit vector has been updated, a future read operation will use the new encryption key and will locate the most recent copy of the track containing the desired blocks—using the updated bit vector to locate the track to read. The bit vector gets updated on the disk copy of the bit vector after the disk reports completion of the re-encrypted track write. It is important to track what has been definitely committed to disk, and what is not yet definitely committed to disk. Previous key versions of a disk track are read-only, so a new write cannot inadvertently change a previous-key track. That is, no commits of new data to tracks can be completed before ensuring that the specified track is the only valid place from which to fetch the data. If existing data is consistently migrated to a new track before a write is allowed, and updates to the bit vector get committed between writes, committed writes do not get "lost".

For encryption key rotation, a system must maintain a list of keys to be used for decrypting and encrypting tenant data, and the system must be able to apply these keys as the software needs to read the corresponding data. Additionally, to migrate from an old encryption key to a new encryption key, existing data must be read and re-encrypted, a process which can take hours. To avoid service outages for customers who choose to rotate keys, an enterprise needs to, at times, be willing to apply old encryption keys as well as new keys to data that needs to flow into their applications, at least to perform on-the-fly re-encryption. The disclosed technology enables read access during copying forward from an older to a newer generation of a track.

Existing encrypted tracks can retain presentation of their data (after encryption) to a unified track, while newly-written data could exist on a track whose underlying data storage uses the newest encryption key. At the whole-volume layer, large runs of blocks can be associated, and blocks can be allocated to volumes sequentially, so that only a starting offset is needed to convert volume block numbers into a physical disk block address. By aligning the writable area of the track at the end of these concatenated pieces, we can provide the appearance of an extensible track. An environment for accessing content in a multi-tier disk partition system is described next.

Environment for Accessing Content in a Multi-Tier Disk Partition System

FIG. 1 illustrates one environment 100 for accessing content in a multi-tier disk partition system. Environment 100 can include a data store 112, disk partition system 115, multi-user management server 116, presentation server 128, business logic server 138, backend data server 158, hardware security module (HSM) 122 and user computing device 154.

Multi-user management server 116 administers access to multiple users and companies for an enterprise, via both browser UIs and mobile applications, limiting access to authorized users and managing access for users and companies. For some use cases, multi-user management server 116 administers platform-level encryption, designed to allow retention of critical app functionality—like search, workflow, and validation rules—as well as full control over encryption keys, setting encrypted data permissions to protect sensitive data from unauthorized users. Hardware security module (HSM) 122 includes a dedicated crypto processor that is specifically designed for the protection of encryption keys inside a hardened, tamper-resistant device.

Data store 112 includes personal data and customer information in database tables, relationships and UI elements—including, but not limited to metadata—data about the data itself.

User computing device 154 includes a web browser 164 and/or a mobile application 174. In some implementations, user computing device 154 can be a personal computer, laptop computer, tablet computer, smartphone, personal digital assistant (PDA), digital image capture devices, and the like.

One architectural pattern for implementing web services includes browser facing applications for business to business communications, via three tiers of services. Presentation server 128, business logic server 138 and backend data server 158 could run on the same server, and typically are implemented on separate servers, including clustered high performance backend data servers.

In some implementations, the modules of environment 100 can be of varying types including workstations, servers, computing clusters, blade servers, server farms, or any other data processing systems or computing devices. Modules can be communicably coupled to the data store via a different network connection. For example, multi-user management server 116 can be coupled via the network 125 (e.g., the Internet) and disk partition system 115 can be coupled to a direct network link and can additionally be coupled via a direct link to data store 112. In some implementations, user computing device 154 may be connected via a WiFi hotspot.

In some implementations, network(s) 125 can be any one or any combination of Local Area Network (LAN), Wide Area Network (WAN), WiFi, WiMAX, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

In some implementations, datastores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

In other implementations, environment 100 may not have the same elements as those listed above and/or may have other/different elements instead of, or in addition to, those listed above.

The technology disclosed can be implemented in the context of any computer-implemented system including a database system, a multi-tenant environment, or the like. Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Figure 2:
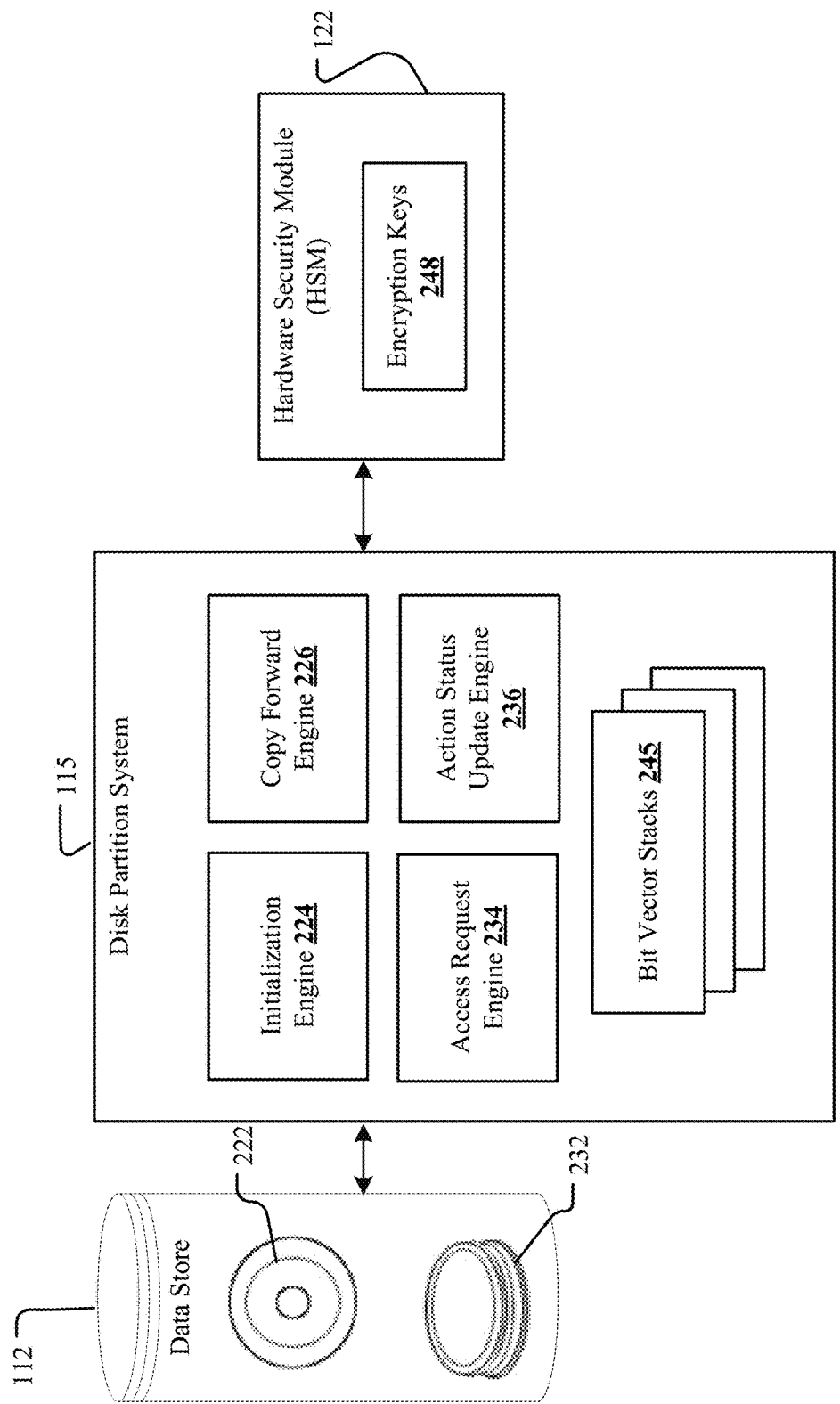
FIG. 2 shows an example block diagram for an environment for implementing access to content in rotatable-key encrypted volumes in a multi-tier disk partition system.

FIG. 2 shows a block diagram with data store 112, disk partition system 115 and hardware security module 122. Data store 112 includes track 222 on one of the platters of cylinder 232. A disk partition can be the union of possibly hundreds or thousands of tracks. Disk partition system 115 includes initialization engine 224 for initializing track 222, access request engine 234 for processing read and write requests for data in data store 112. Copy forward engine 226 in disk partition system 115 manages the process of copying forward data, accessed with an encryption key from one tier-track, to a subsequent tier-track with a new encryption key. Disk partition system 115 includes bit vector stacks 245 stored is SSD memory—with a bit vector for each tier-track and a bit flag with each bit vector that indicates whether the tier-track is current and holds currently active data or whether another bit vector in the stack of bit vectors needs to be consulted for access to a predecessor of the respective tier-track. Action status update engine 236 in disk partition system 115 updates bit vector stacks 245 with bit vectors and bit flags associated with each tier-track.

Continuing the description of the block diagram of FIG. 2, hardware security module 122 manages unified-key-setup disk encryption sets and includes encryption keys 248. In one implementation, hardware security module 122 implements Linux Unified Key Setup (LUKS) disk encryption. In another use case, hardware security module 122 implements BitLocker encryption to protect data by providing encryption for tracks of entire partitions and volumes.

Figure 3:
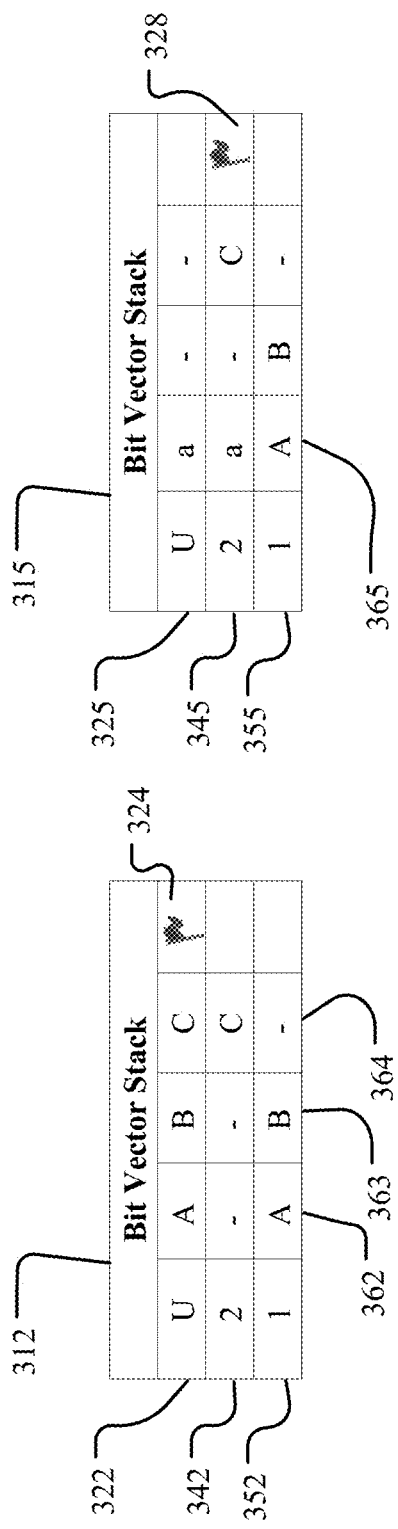
FIG. 3 shows example bit vector stacks for multiple tiers of multiple tracks in a disk partition system.

The disclosed technology for accessing content in a multi-tier disk partition system includes the disk partition system having a first-tier-track in persistent memory. The disk partition system initializes a second-tier-track in the persistent memory, with the second-tier-track supporting file blocks residing on the second-tier-track that are accessible using a same block designator as respective file blocks residing on the first-tier-track. The second-tier-track is in a disk partition that has a stack of bit vectors for respective tiers of tracks, including a first-tier bit vector and a second-tier bit vector; and a second-tier-track bit flag in the second-tier bit vector indicates whether a respective second-tier-track is current and holds currently active data or whether another bit vector in the stack of bit vectors needs to be consulted for access to a predecessor of the respective second-tier-track;

FIG. 3 shows an example data model for a disk partition system with two distinct bit vector stacks 312, 315. The two bit vector stacks shown include two bit vectors each, representing two tiers of a track, for each of three tracks A, B and C. Blank lines in the bit vector stacks 312, 315 represent placeholders for data. The bit vectors include mappings that refer access to data in a previous-tier track. Bit vectors and bit flags 324, 328 indicate whether a respective track tier is current and holds currently active data or whether another bit vector in the stack of bit vectors needs to be consulted for access to a predecessor of the respective track. Bit vector stack 312, for track A 362, track B 363 and track C 364, each have a first-tier-track 352 and a second-tier-track 342, represented with single characters, for ease of visualization.

In bit vector stack 312, mount point U 322 shows the result of applying the disclosed method of access to content. U represents a unification of first-tier-track 352 and second-tier-track 342—in that order. Active data, in higher-tier tracks, obscures data in lower tier tracks. A union bit vector for first-tier-track 352 and second-tier-track 342, U 322 is ABC. Union U includes data C from second-tier-track 342 and data AB acquired from first-tier-track 352—acquired by following mappings associated with the block designator of second-tier-track 342, to access data from the first tier-track. Bit flag 324 indicates that the union tier-track is current is holds currently active data. The union of the logical tracks holds the up-to-date data, identified via the bit vector stack which shows which of the tracks are still valid and which tracks have been supplanted by transferring the tracks to newer keys.

Continuing with FIG. 3, for a second bit vector stack 315, second-tier-track 345 track a, supplants the first-tier-track A 355 for track 365; the unified tier-track 325 is "a". That is, when reading the unified version of data 325, the mapping of second-tier-track 345 overrides the contents of first-tier-track 352. For bit vector stacks and bit flags represented by blank lines, the track-tier mappings refer read access to data in earlier tier-tracks. The location of bit flag 328 indicates a need to consult with another bit vector in the stack of bit vectors for access to a predecessor of the respective second-tier-track, to complete the union-tier-track 325, with a copy forward to add track B from first-tier-track 355 and track C from second-tier-track 345. The concepts elucidated in FIG. 3 and the accompanying narrative can be applied on a broad scale.

As a copy forward proceeds, the OS notes the track that is in the process of migration and postpones a write to disk for one track rotation, so five to ten milliseconds. The OS defers acknowledging receipt of write, or defers acknowledgement that the write has been committed to disk. For a synchronous write, the OS notices that the track is busy and waits 10 ms until the lock is released. For an asynchronous write, the write request gets buffered, and when the track becomes available, then the OS issues the write. A log can track, in order by date, what has been written to each track on the physical surface. If a fault occurs the log can be used to decipher the state of the disk partition, and the OS can rollback to return to a known state. After data has been migrated from an existing track to a new track, the earlier-tier track can be freed and can be available for use by other virtual partitions.

In some implementations, three tier tracks can be active for brief periods: with an old encryption key, an ancient encryption key for a track tier in which most but not all of the existing data has been migrated, and a current track tier where data is currently stored or where it is about to be stored.

Bit vectors are small enough to keep in memory at all times. The bit vector stack can be reloaded into memory and consulted after a reboot of the system. The background OS process ensures that the bit vectors are written as soon as data migration is complete for a track tier, to communicate that a copy forward has occurred, and that the encryption keys are up-to-date. Before the OS confirms completion of a write operation, the bit vector updates get committed.

In one use case, for a disk drive size is in the terabyte range, the number of tracks is approximately a billion. In that case, the bit vector stack fits into a few hundred megabytes of SSD memory. The OS process need not consult disk to determine which tracks are useful, because the track information is stored in SSD memory. The OS maintains a mapping of logical tracks as data moves from one track-tier to the next—using a bit vector stored in a way that is quasi-permanent—and maintains a mapping of which copy corresponds to which encryption key.

In one use case, a look-aside cache satisfies reads submitted during a pending write, to implement see-your-own-writes semantics, but it is not critical until the write is fully acknowledged. In a synchronous write, the same thread cannot proceed until after the call completes. In the asynchronous case, it is easier on the client to have the look-aside cache, but serializability—ensuring that a schedule for executing concurrent transactions is equivalent to one that executes the transactions serially in some order—is preserved either way. That is, when a synchronous write is received, the OS process will not return from that call until the track has been migrated, if needed, followed by committing the updated bit vectors, and writing the updated bit vectors to stable storage. For an asynchronous write, the OS can return and can schedule copy-forward as needed right away, and defer the completion event until the data transfer is complete and the bit vector has been updated. As long as the OS does not return old data after a call which returned the new data, everything is serializable. To handle a possible crash in the middle of a write operation, it is possible to perform commits in an order consistent with the order of subsequent reads, so that there is a single virtual time stream, so that a write followed by a read followed by a write someplace else does not lead to a state in which the final write is committed showing the new data, but the first one reverts. This functionality can be handled with standard two-phase commits, and write logging. The look-aside buffering means that the OS process can force serialization by returning only the new data once a return from the write call is received, barring a crash, in which case you can return whatever the OS process has determined is appropriate after recovery.

Even with volume sizes that match disk sizes, bit vectors will not be enormous: even allowing for a few decades of disk growth, a physical disk will not likely exceed a petabyte for at least a decade, and even that size disk contains only a million gigabytes, so the bit vector needs only 128 kilobytes to store the map for a petabyte volume—by which point the unit of allocation may well have gone up to multiple gigabytes. In some implementations, the exponent of the effective volume size can be stored as the first byte of the mapping file for a volume so that data can be migrated over time. In some use cases a cryptographic seal can be implemented on the versioned metadata for the disk. Migration from a disk volume to a larger disk volume can be completed, so long as commitment is deferred until all of the constituent tracks have been moved. If the effective track size is the log base two of the track size—twenty represents a track of 2 to the $20^{th}$ bytes, or a megabyte; thirty represents gigabyte chunks, forty represents a terabyte, etc. Volume size can be stored in a single byte or the volume size metadata field can be 16, 32, 64 or 128 bits, indicating volume size field in the version characters immediately preceding the track size. In one use case, RVE0 for Rotatable Volume Encryption using 1 unsigned byte to store the logarithm of the track size, up to RVE1, RVE2 and RVE3, where the final byte is the log base two of the logarithm of the number of bytes allocated. In another use case, a different sequence that grows slightly slower and nests better, such a Fibonacci numbers can be utilized to represent volume sizes.

Figure 4:
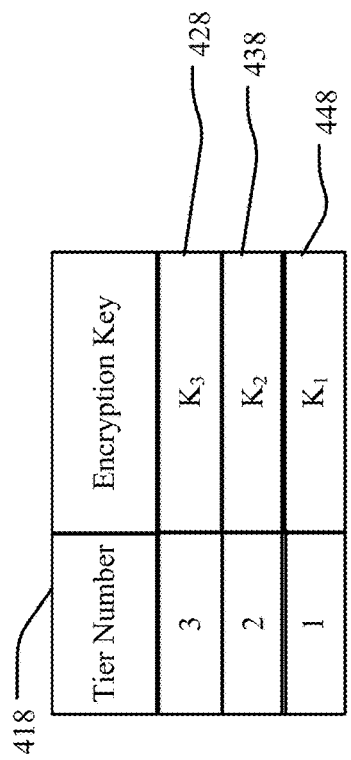
FIG. 4 shows an example table with tiers of a track and related encryption keys.

FIG. 4 shows an example relationship between tier-tracks of a disk partition system and encryption keys 418. First tier file and other files of the first tier are encrypted using a first encryption key $K_1$ 448; and then a second encryption key $K_2$ 438 is applied to encrypt data in the second tier track during the copying forward and write access described earlier. A third encryption key $K_3$ 428 gets applied to encrypt data in a third tier track during a subsequent copying forward and write access. Data gets written to the second tier track using the second encryption key, as an update to data provided from the first tier track, during the copying forward from the first tier track to the second tier track.

To implement encryption key rotation for the disclosed technology, the disk partition system can create non-union tracks to represent each encryption key rotation, with time and date of key generation, in one use case. The non-union directories would be placed first in a union with the tier of the immediately previous generation. This implementation would include walking down the history list to fully enumerate all components of the union. Alternatively, a union explicitly listing all the still-active previous tracks could be constructed, to reduce effort on the union-of-tracks lookups so that the flattening of the track paths could be performed only once, instead of every time the union-of-tracks was opened. In another use case, this flattening of the track paths can be deferred until the first time the union-of-tracks gets opened. One goal is to efficiently remember contiguous runs of tracks from the same volume to allow efficient retrieval, so it may be preferable to copy-forward tracks out of order of request, in order to keep the exception lists as short as possible. Eventually the goal is to get to a run-length compressed encoding of the bit vector, which is primarily a safety fallback for recovery after a crash.

For some implementations, to migrate all data blocks to the tier with the newest encryption key, a background cache can be implemented while copy forward of the content is completed—so the copy in the most recent tier no longer has tracks that have yet to be removed. Optionally, the earlier encryption keys can be retired and blocks of data in earlier tiers can be deleted, to free disk space and thwart access using retired keys.

Workflow

Figure 5:
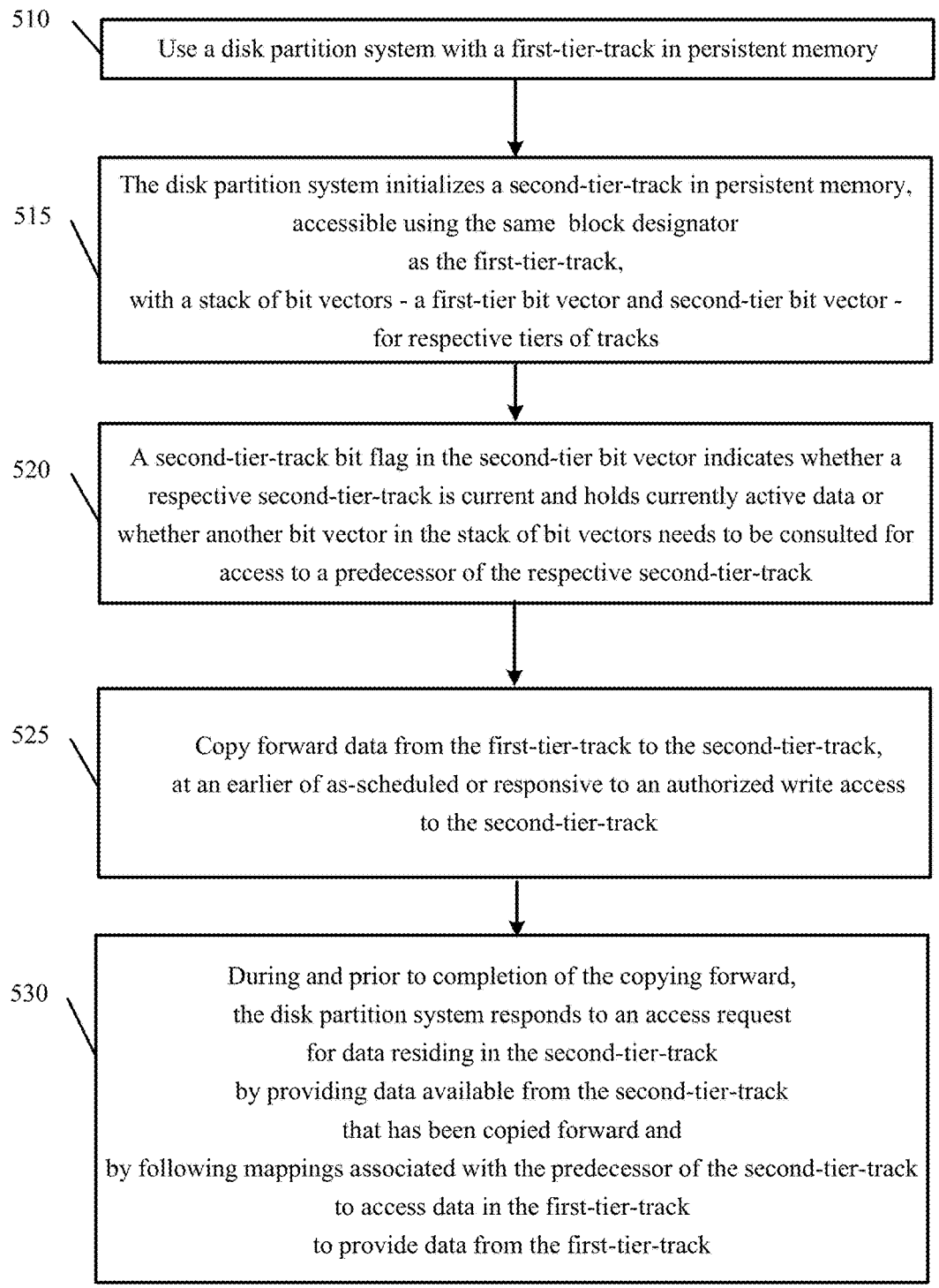
FIG. 5 is an example workflow for a multi-tier disk partition system with stacks of flag sets.

FIG. 5 is a flowchart 500 of one implementation of an environment to access content in a multi-tier disk partition system. Flowchart 500 can be implemented at least partially with a database system, e.g., by one or more processors configured to receive or retrieve information, process the information, store results, and transmit the results. Other implementations may perform the actions in different orders and/or with different, fewer or additional actions than those illustrated in FIG. 5. Multiple actions can be combined in some implementations. For convenience, this flowchart is described with reference to a method.

At action 510, use a disk partition system having a first-tier-track in persistent memory, and the disk partition system running on a hardware processor.

At action 515, the disk partition system initializes a second-tier-track in the persistent memory, wherein the second-tier-track supports file blocks residing on the second-tier-track that are accessible using a same block designator as respective file blocks residing on the first-tier-track. The second-tier-track is in a disk partition that has a stack of bit vectors for respective tiers of tracks, including a first-tier bit vector and a second-tier bit vector.

At action 520, a second-tier-track bit flag in the second-tier bit vector indicates whether a respective second-tier-track is current and holds currently active data or whether another bit vector in the stack of bit vectors needs to be consulted for access to a predecessor of the respective second-tier-track.

At action 525, copy forward data from the first-tier-track to the second-tier-track, at an earlier of as-scheduled or responsive to an authorized write access to the second-tier-track.

At action 530, during and prior to completion of the copying forward, the disk partition system responds to an access request for data residing in the second-tier-track by providing data available from the second-tier-track that has been copied forward and by following mappings associated with the predecessor of the second-tier-track to access data in the first-tier-track to provide data from the first-tier-track.

Figure 6:
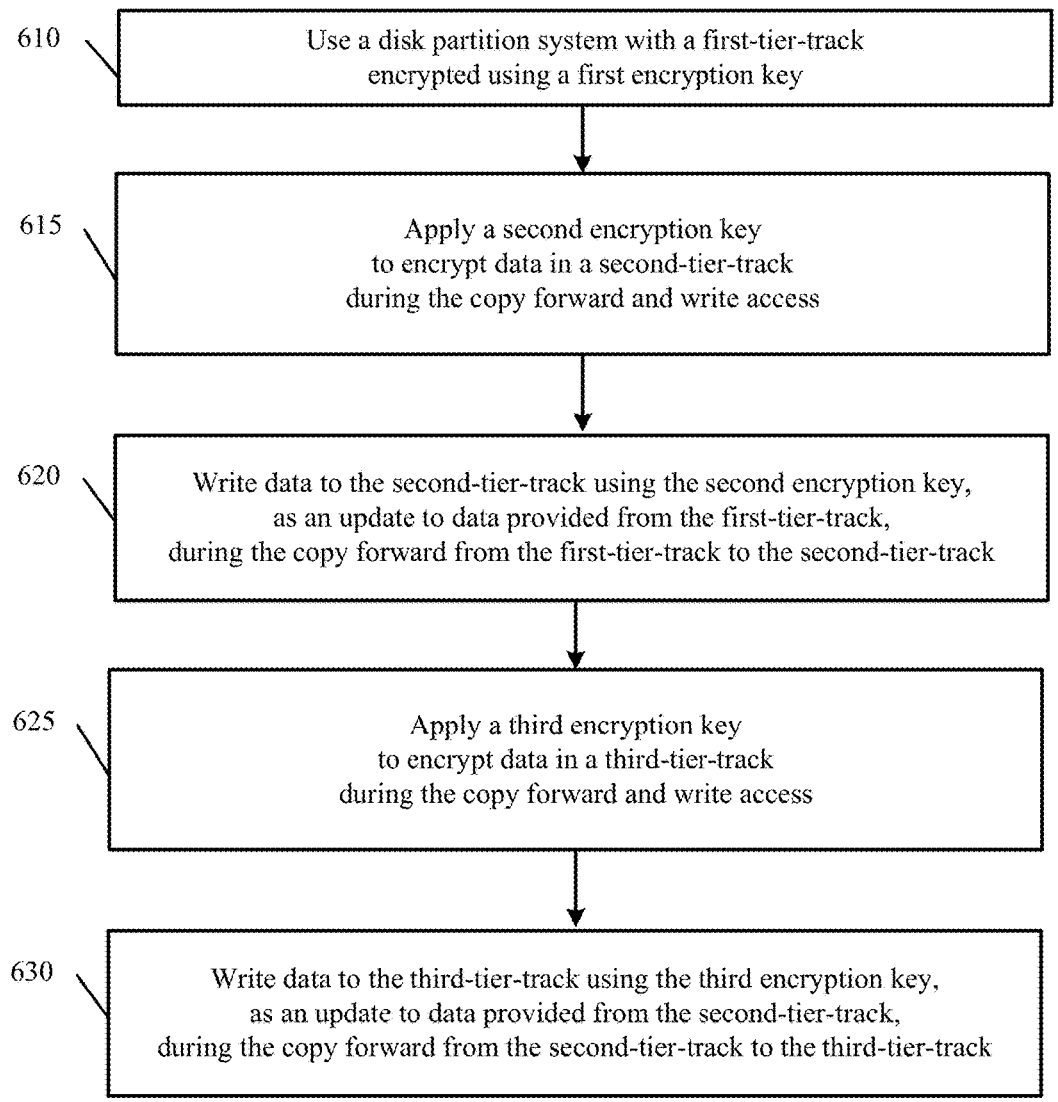
FIG. 6 is an example workflow for a multi-tier disk partition system for implementing disk partition system level key rotation.

FIG. 6 is a flowchart 600 of one implementation of an environment to access content in a multi-tier disk partition system to implement encryption key rotation. Other implementations may perform the actions in different orders and/or with different, fewer or additional actions than those illustrated in FIG. 6. Multiple actions can be combined in some implementations. For convenience, this flowchart is described with reference to a method.

At action 610, use a disk partition system with a first-tier-track encrypted using a first encryption key.

At action 615, apply a second encryption key to encrypt data in the second tier track during the copying forward and write access.

At action 620, write data to the second-tier-track using the second encryption key, as an update to data provided from the first-tier-track, during the copy forward from the first-tier-track to the second-tier-track.

At action 625, apply a third encryption key to encrypt data in a third-tier-track during the copy forward and write access.

At action 630, write data to the third-tier-track using the third encryption key, as an update to data provided from the second-tier-track, during the copy forward from the second-tier-track to the third-tier-track.

The actions described above can be subdivided into more steps or combined into fewer steps to carry out the method described using a different number or arrangement of steps.

Multi-Tenant Integration

Figure 7:
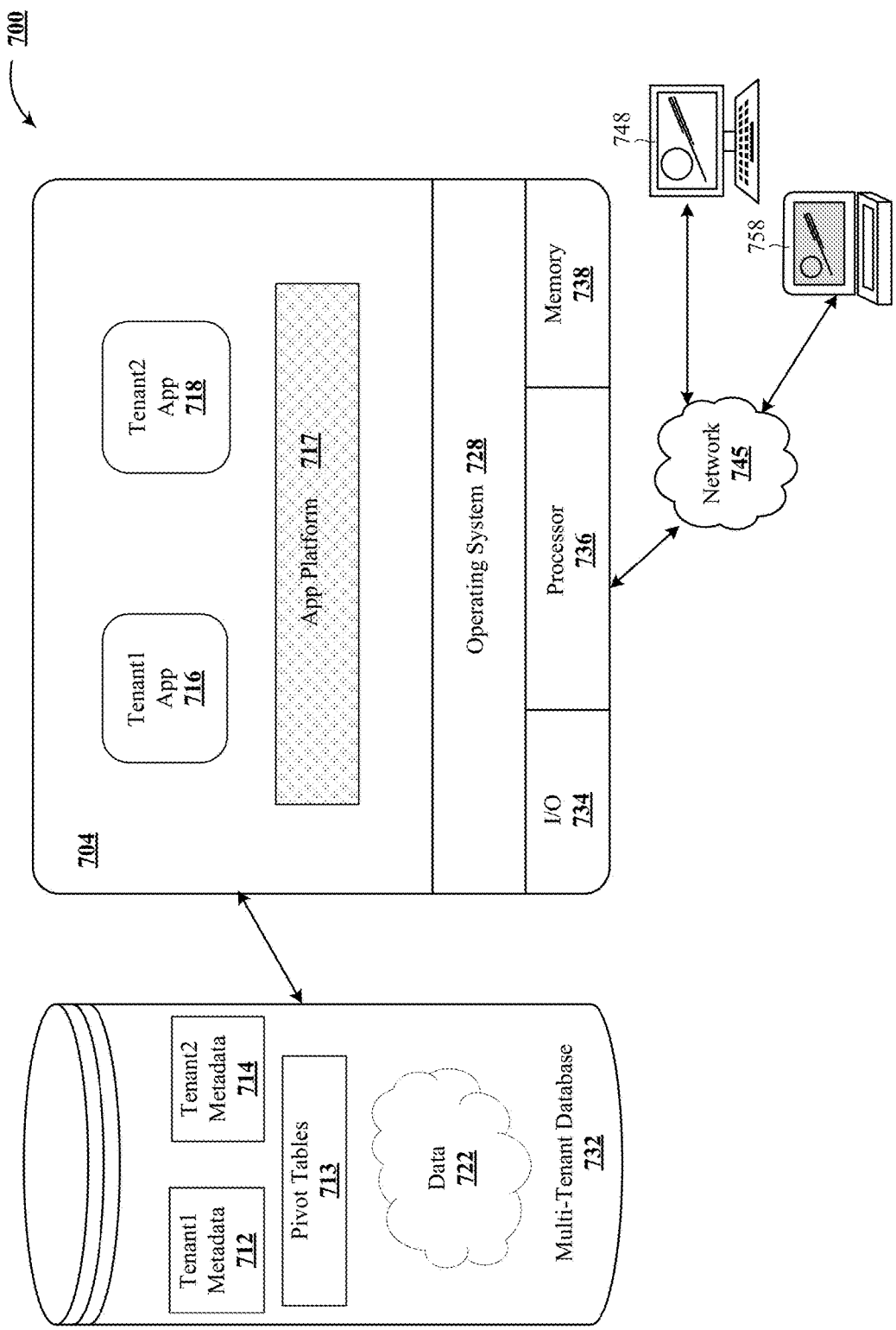
FIG. 7 is an example environment for implementing disk-partition-system-level key rotation in a multi-tier disk partition system with stacks of flag sets.

FIG. 7 presents a block diagram of an exemplary multi-tenant system 700 suitable for implementing rotatable-key encrypted volumes in a multi-tier disk partition system in environment 100 of FIG. 1. In general, the illustrated multi-tenant system 700 of FIG. 7 includes a server 704 that dynamically supports virtual applications 716 and 718, based upon data 722 from a common database 732 that is shared between multiple tenants, alternatively referred to herein as a "multi-tenant database". Data and services generated by the virtual applications 716 and 718, including GUI clients, are provided via a network 745 to any number of client devices 748 or 758, as desired.

As used herein, a "tenant" or an "organization" refers to a group of one or more users that shares access to common subset of the data within the multi-tenant database 732. In this regard, each tenant includes one or more users associated with, assigned to, or otherwise belonging to that respective tenant. Stated another way, each respective user within the multi-tenant system 700 is associated with, assigned to, or otherwise belongs to a particular tenant of the plurality of tenants supported by the multi-tenant system 700. Tenants may represent users, user departments, work or legal organizations, and/or any other entities that maintain data for particular sets of users within the multi-tenant system 700. Although multiple tenants may share access to the server 704 and the database 732, the particular data and services provided from the server 704 to each tenant can be securely isolated from those provided to other tenants. The multi-tenant architecture therefore allows different sets of users to share functionality and hardware resources without necessarily sharing any of the data 722 belonging to or otherwise associated with other tenants.

The multi-tenant database 732 is any sort of repository or other data storage system capable of storing and managing the data 722 associated with any number of tenants. The database 732 may be implemented using any type of conventional database server hardware. In various implementations, the database 732 shares processing hardware with the server 704. In other implementations, the database 732 is implemented using separate physical and/or virtual database server hardware that communicates with the server 704 to perform the various functions described herein. The multi-tenant database 732 may alternatively be referred to herein as an on-demand database, in that the multi-tenant database 732 provides (or is available to provide) data at run-time to on-demand virtual applications 716 or 718 generated by the application platform 717, with tenant1 metadata 712 and tenant2 metadata 714 securely isolated.

In practice, the data 722 may be organized and formatted in any manner to support the application platform 722. In various implementations, conventional data relationships are established using any number of pivot tables 713 that establish indexing, uniqueness, relationships between entities, and/or other aspects of conventional database organization as desired.

The server 704 is implemented using one or more actual and/or virtual computing systems that collectively provide the dynamic application platform 717 for generating the virtual applications. For example, the server 704 may be implemented using a cluster of actual and/or virtual servers operating in conjunction with each other, typically in association with conventional network communications, cluster management, load balancing and other features as appropriate. The server 704 operates with any sort of conventional processing hardware such as a processor 736, memory 738, input/output features 734 and the like. The input/output 734 generally represent the interface(s) to networks (e.g., to the network 745, or any other local area, wide area or other network), mass storage, display devices, data entry devices and/or the like. User interface input devices 734 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include possible types of devices and ways to input information into computer system 717.

User interface output devices can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from processor 736 to the user or to another machine or computer system.

The processor 736 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 738 represents any non-transitory short or long term storage or other computer-readable media capable of storing programming instructions for execution on the processor 736, including any sort of random access memory (RAM), read only memory (ROM), flash memory, magnetic or optical mass storage, and/or the like. The computer-executable programming instructions, when read and executed by the server 704 and/or processor 736, cause the server 704 and/or processor 736 to create, generate, or otherwise facilitate the application platform 717 and/or virtual applications 716 and 718, and perform one or more additional tasks, operations, functions, and/or processes described herein. It should be noted that the memory 738 represents one suitable implementation of such computer-readable media, and alternatively or additionally, the server 704 could receive and cooperate with external computer-readable media that is realized as a portable or mobile component or application platform, e.g., a portable hard drive, a USB flash drive, an optical disc, or the like.

The application platform 717 is any sort of software application or other data processing engine that generates the virtual applications 716 and 718 that provide data and/or services to the client devices 748 and 758. In a typical implementation, the application platform 717 gains access to processing resources, communications interfaces and other features of the processing hardware using any sort of conventional or proprietary operating system 728. The virtual applications 716 and 718 are typically generated at run-time in response to input received from the client devices 748 and 758.

With continued reference to FIG. 7, the data and services provided by the server 704 can be retrieved using any sort of personal computer, mobile telephone, tablet or other network-enabled client device 748 or 758 on the network 745. In an exemplary implementation, the client device 748 or 758 includes a display device, such as a monitor, screen, or another conventional electronic display capable of graphically presenting data and/or information retrieved from the multi-tenant database 732.

In some implementations, network(s) 745 can be any one or any combination of Local Area Network (LAN), Wide Area Network (WAN), WiMAX, Wi-Fi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Particular Implementations

In one implementation, a method of access to content in a multi-tier disk partition system includes using a disk partition system having a first-tier-track in persistent memory, and the disk partition system running on a hardware processor, with the disk partition system initializing a second-tier-track in the persistent memory. The second-tier-track supports file blocks residing on the second-tier-track that are accessible using a same block designator as respective file blocks residing on the first-tier-track; the second-tier-track is in a disk partition that has a stack of bit vectors for respective tiers of tracks, including a first-tier bit vector and a second-tier bit vector; and a second-tier-track bit flag in the second-tier bit vector indicates whether a respective second-tier-track is current and holds currently active data or whether another bit vector in the stack of bit vectors needs to be consulted for access to a predecessor of the respective second-tier-track. The method also includes copying forward data from the first-tier-track to the second-tier-track, at an earlier of as-scheduled or responsive to an authorized write access to the second-tier-track. The method further includes, during and prior to completion of the copying forward, the disk partition system responding to an access request for data residing in the second-tier-track by providing data available from the second-tier-track that has been copied forward and by following mappings associated with the predecessor of the second-tier-track to access data in the first-tier-track to provide data from the first-tier-track.

This method and other implementations of the technology disclosed can include one or more of the following features and/or features described in connection with additional methods disclosed. In the interest of conciseness, the combinations of features disclosed in this application are not individually enumerated and are not repeated with each base set of features.

The disclosed method further includes the disk partition system initializing a third-tier-track, wherein blocks in the third-tier-track are accessible using a same block designator as respective file blocks residing on the second-tier-track, and the third-tier-track has a third-tier bit vector that indicates whether a respective third-tier-track is current and holds currently active data or whether another bit vector in the stack of bit vectors needs to be consulted for access to a predecessor of the respective third-tier-track. The method also includes copying forward data from the second-tier-track, at an earlier of as-scheduled or responsive to an authorized write access to the third-tier-track; and during and prior to completion of the copying forward, the disk partition system responding to an access request for data residing in the third-tier-track by providing data available from the third-tier-track that has been copied forward and by following mappings associated with the predecessor of the third-tier-track to access data in the second-tier-track to provide data from the second-tier-track. Prior to completion of copying forward of data from the second-tier-track to the third-tier-track, the disk partition system follows mappings associated with the bit vectors to access blocks in the second-tier-track to provide data from the second-tier-track.

In some implementations of the disclosed method include the first-tier-track encrypted using a first encryption key; and applying a second encryption key to encrypt data in the second-tier-track during the copying forward and write access. The disclosed method can further include applying a third encryption key to encrypt data in a third-tier-track during copying forward and write access to the third-tier-track. The disclosed method further includes writing data to the second-tier-track using the second encryption key, as an update to data provided from the first-tier-track, during the copying forward from the first-tier-track to the second-tier-track. For the disclosed method, the stack of bit vectors is implemented and persisted upon update in a persistent solid state memory. In some implementations, tracks in a disk partition are contiguous to simplify mapping. In other implementations, disks with constant angular velocity utilize logical to physical track mapping, so contiguous mapping is not required. Disks with constant linear velocity can utilize a complete physical map of the tracks. Disks with constant linear velocity are typically designed in a way that permits the assumption that a track is the same length independent of physical location on the disk.

The disclosed method for responding to the access request further includes providing data from a combination of the second-tier-track and first-tier-track during the copying forward from the first-tier-track to the second-tier-track. In some implementations, the disclosed method includes writing data to the second-tier-track, as an update to data provided from the first-tier-track, during the copying forward from the first-tier-track to the second-tier-track.

Another implementation may include a device that provides access to content in a multi-tier disk partition system, the device including a processor, memory coupled to the processor, and computer instructions loaded into the memory that, when executed, cause the processor to implement a process that can implement any of the methods described above.

Yet another implementation may include a tangible non-transitory computer readable storage medium including computer program instructions that, when executed, cause a computer to implement any of the methods described earlier.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A method of access to content in a multi-tier disk partition system, including:
   using a disk partition system having a first-tier-track in persistent memory, and the disk partition system running on a hardware processor:
     the disk partition system initializing a second-tier-track in the persistent memory,
       wherein the second-tier-track supports file blocks residing on the second-tier-track that are accessible using a same block designator as respective file blocks residing on the first-tier-track;
     the second-tier-track is in a disk partition that has a stack of bit vectors for respective tiers of tracks, including a first-tier bit vector and a second-tier bit vector; and
     a second-tier-track bit flag in the second-tier bit vector indicates whether a respective second-tier-track is current and holds currently active data or whether another bit vector in the stack of bit vectors needs to be consulted for access to a predecessor of the respective second-tier-track;
   copying forward data from the first-tier-track to the second-tier-track, at an earlier of as-scheduled or responsive to an authorized write access to the second-tier-track; and
   during and prior to completion of the copying forward, the disk partition system responding to an access request for data residing in the second-tier-track by providing data available from the second-tier-track that has been copied forward and by following mappings associated with the predecessor of the second-tier-track to access data in the first-tier-track to provide data from the first-tier-track.

2. The method of claim 1, further including:
the disk partition system initializing a third-tier-track, wherein blocks in the third-tier-track are accessible using a same block designator as respective file blocks residing on the second-tier-track, and the third-tier-track has a third-tier bit vector that indicates whether a respective third-tier-track is current and holds currently active data or whether another bit vector in the stack of bit vectors needs to be consulted for access to a predecessor of the respective third-tier-track; and
copying forward data from the second-tier-track, at an earlier of as-scheduled or responsive to an authorized write access to the third-tier-track; and
during and prior to completion of the copying forward, the disk partition system responding to an access request for data residing in the third-tier-track by providing data available from the third-tier-track that has been copied forward and by following mappings associated with the predecessor of the third-tier-track to access data in the second-tier-track to provide data from the second-tier-track.

3. The method of claim 2, wherein prior to completion of copying forward of data from the second-tier-track to the third-tier-track, the disk partition system following mappings associated with the bit vectors to access blocks in the second-tier-track to provide data from the second-tier-track.

4. The method of claim 1, further including:
the first-tier-track encrypted using a first encryption key; and
applying a second encryption key to encrypt data in the second-tier-track during the copying forward and write access.

5. The method of claim 4, further including applying a third encryption key to encrypt data in a third-tier-track during copying forward and write access to the third-tier-track.

6. The method of claim 4, further including writing data to the second-tier-track using the second encryption key, as an update to data provided from the first-tier-track, during the copying forward from the first-tier-track to the second-tier-track.

7. The method of claim 1, wherein the stack of bit vectors is implemented and persisted, upon update, in a persistent solid state memory.

8. The method of claim 1, wherein responding to the access request further includes providing data from a combination of the second-tier-track and first-tier-track during the copying forward from the first-tier-track to the second-tier-track.

9. The method of claim 1, further including writing data to the second-tier-track, as an update to data provided from the first-tier-track, during the copying forward from the first-tier-track to the second-tier-track.

10. A device that provides access to content in a multi-tier disk partition system, the device including:
a processor, memory coupled to the processor, and computer instructions loaded into the memory that, when executed, cause the processor to implement a process that includes:
using a disk partition system having a first-tier-track in persistent memory, and the disk partition system running on a hardware processor:
the disk partition system initializing a second-tier-track in the persistent memory,
wherein the second-tier-track supports file blocks residing on the second-tier-track that are accessible using a same block designator as respective file blocks residing on the first-tier-track;
the second-tier-track is in a disk partition that has a stack of bit vectors for respective tiers of tracks, including a first-tier bit vector and a second-tier bit vector; and
a second-tier-track bit flag in the second-tier bit vector indicates whether a respective second-tier-track is current and holds currently active data or whether another bit vector in the stack of bit vectors needs to be consulted for access to a predecessor of the respective second-tier-track;
copying forward data from the first-tier-track to the second-tier-track, at an earlier of as-scheduled or responsive to an authorized write access to the second-tier-track; and
during and prior to completion of the copying forward, the disk partition system responding to an access request for data residing in the second-tier-track by providing data available from the second-tier-track that has been copied forward and by following mappings associated with the predecessor of the second-tier-track to access data in the first-tier-track to provide data from the first-tier-track.

11. The device of claim 10, further including:
the disk partition system automatically initializing a third-tier-track, wherein blocks in the third-tier-track are accessible using a same block designator as respective file blocks residing on the second-tier-track, and the third-tier-track has a third-tier bit vector that indicates whether a respective third-tier-track is current and holds currently active data or whether another bit vector in the stack of bit vectors needs to be consulted for access to a predecessor of the respective third-tier-track; and
copying forward data from the second-tier-track, at an earlier of as-scheduled or responsive to an authorized write access to the third-tier-track; and
during and prior to completion of the copying forward, the disk partition system responding to an access request for data residing in the third-tier-track by providing data available from the third-tier-track that has been copied forward and by following mappings associated with the predecessor of the third-tier-track to access data in the second-tier-track to provide data from the second-tier-track.

12. The device of claim 11, wherein:
prior to completion of copying forward of data from the second-tier-track to the third-tier-track, the disk partition system following mappings associated with the bit vectors to access blocks in the second-tier-track to provide data from the second-tier-track.

13. The device of claim 10, further including:
the first-tier-track encrypted using a first encryption key; and
applying a second encryption key to encrypt data in the second-tier-track during the copying forward and write access.

14. The device of claim 13, further including applying a third encryption key to encrypt data in a third-tier-track during copying forward and write access to the third-tier-track.

15. The device of claim 13, further including writing data to the second-tier-track using the second encryption key, as an update to data provided from the first-tier-track, during the copying forward from the first-tier-track to the second-tier-track.

16. The device of claim 10, wherein the stack of bit vectors is implemented and persisted upon update in a persistent solid state memory.

17. The device of claim 10, wherein responding to the access request further includes providing data from a combination of the second-tier-track and first-tier-track during the copying forward from the first-tier-track to the second-tier-track.

18. The device of claim 10, further including writing data to the second-tier-track, as an update to data provided from the first-tier-track, during the copying forward from the first-tier-track to the second-tier-track.

19. A tangible non-transitory computer readable storage medium that stores program instructions that, when executed, cause a computer to implement a method of access to content in a multi-tier disk partition system, the method including:
  using a disk partition system having a first-tier-track in persistent memory, and the disk partition system running on a hardware processor:
    the disk partition system initializing a second-tier-track in the persistent memory,
      wherein the second-tier-track supports file blocks residing on the second-tier-track that are accessible using a same block designator as respective file blocks residing on the first-tier-track;
    the second-tier-track is in a disk partition that has a stack of bit vectors for respective tiers of tracks, including a first-tier bit vector and a second-tier bit vector; and
    a second-tier-track bit flag in the second-tier bit vector indicates whether a respective second-tier-track is current and holds currently active data or whether another bit vector in the stack of bit vectors needs to be consulted for access to a predecessor of the respective second-tier-track;
    copying forward data from the first-tier-track to the second-tier-track, at an earlier of as-scheduled or responsive to an authorized write access to the second-tier-track; and
    during and prior to completion of the copying forward, the disk partition system responding to an access request for data residing in the second-tier-track by providing data available from the second-tier-track that has been copied forward and by following mappings associated with the predecessor of the second-tier-track to access data in the first-tier-track to provide data from the first-tier-track.

20. The tangible non-transitory computer readable storage medium of claim 19, further including:
  the disk partition system automatically initializing a third-tier-track, wherein blocks in the third-tier-track are accessible using a same block designator as respective file blocks residing on the second-tier-track, and the third-tier-track has a third-tier bit vector that indicates whether a respective third-tier-track is current and holds currently active data or whether another bit vector in the stack of bit vectors needs to be consulted for access to a predecessor of the respective third-tier-track; and
  copying forward data from the second-tier-track, at an earlier of as scheduled or responsive to an authorized write access to the third-tier-track; and
  during and prior to completion of the copying forward, the disk partition system responding to an access request for data residing in the third-tier-track by providing data available from the third-tier-track that has been copied forward and by following mappings associated with the predecessor of the third-tier-track to access data in the second-tier-track to provide data from the second-tier-track.

21. The tangible non-transitory computer readable storage medium of claim 20, wherein prior to completion of copying forward of data from the second-tier-track to the third-tier-track, the disk partition system following mappings associated with the bit vectors to access blocks in the second-tier-track to provide data from the second-tier-track.

22. The tangible non-transitory computer readable storage medium of claim 19, further including:
  the first-tier-track encrypted using a first encryption key; and
  applying a second encryption key to encrypt data in the second-tier-track during the copying forward and write access.

23. The tangible non-transitory computer readable storage medium of claim 22, further including writing data to the second-tier-track using the second encryption key, as an update to data provided from the first-tier-track, during the copying forward from the first-tier-track to the second-tier-track.

24. The tangible non-transitory computer readable storage medium of claim 22, further including applying a third encryption key to encrypt data in a third-tier-track during copying forward and write access to the third-tier-track.

25. The tangible non-transitory computer readable storage medium of claim 19, wherein the stack of bit vectors is implemented and persisted upon update in a persistent solid state memory.

* * * * *